(12) United States Patent
Park

(10) Patent No.: US 9,538,148 B2
(45) Date of Patent: Jan. 3, 2017

(54) METHOD AND APPARATUS FOR TRANSMITTING USER INTENTION USING CAPTURED IMAGE

(75) Inventor: Chan-sik Park, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 1059 days.

(21) Appl. No.: 13/398,043

(22) Filed: Feb. 16, 2012

(65) Prior Publication Data

US 2012/0300066 A1 Nov. 29, 2012

(30) Foreign Application Priority Data

May 27, 2011 (KR) .................. 10-2011-0050847

(51) Int. Cl.
*H04N 7/18* (2006.01)
(52) U.S. Cl.
CPC .................. *H04N 7/185* (2013.01)
(58) Field of Classification Search
CPC .......... H04N 7/181; H04N 7/183; H04N 7/18; H04N 7/188; G08B 13/19656

USPC ........................................... 348/143
See application file for complete search history.

(56) References Cited

U.S. PATENT DOCUMENTS

| | | | |
|---|---|---|---|
| 2004/0199435 A1* | 10/2004 | Abrams et al. | 705/27 |
| 2009/0112683 A1* | 4/2009 | Hamilton et al. | 705/10 |
| 2012/0050324 A1* | 3/2012 | Jeong et al. | 345/633 |

* cited by examiner

*Primary Examiner* — William C Vaughn, Jr.
*Assistant Examiner* — Daniel Tekle
(74) *Attorney, Agent, or Firm* — Sughrue Mion, PLLC

(57) ABSTRACT

A method and apparatus for transmitting a user's intention using a captured image, the method including: if a signal for selecting an article category is received from a terminal, capturing articles belonging to the article category and transmitting the captured image of the articles to the terminal; receiving from the terminal tag information indicating user's intention generated based on the captured image; and mapping the received tag information to a predetermined position on the captured image and transmitting the captured image with the mapped tag information to the terminal.

20 Claims, 6 Drawing Sheets

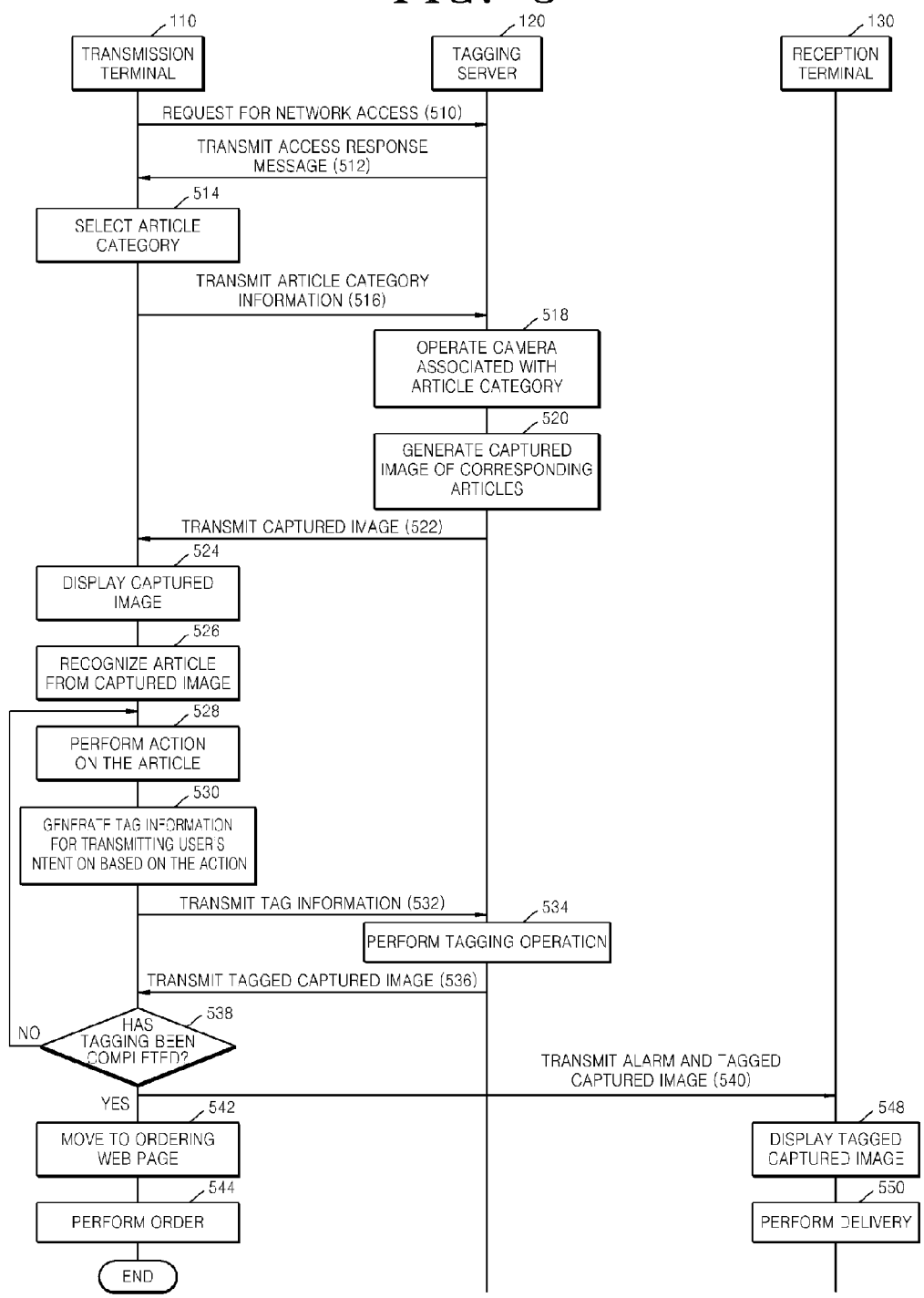

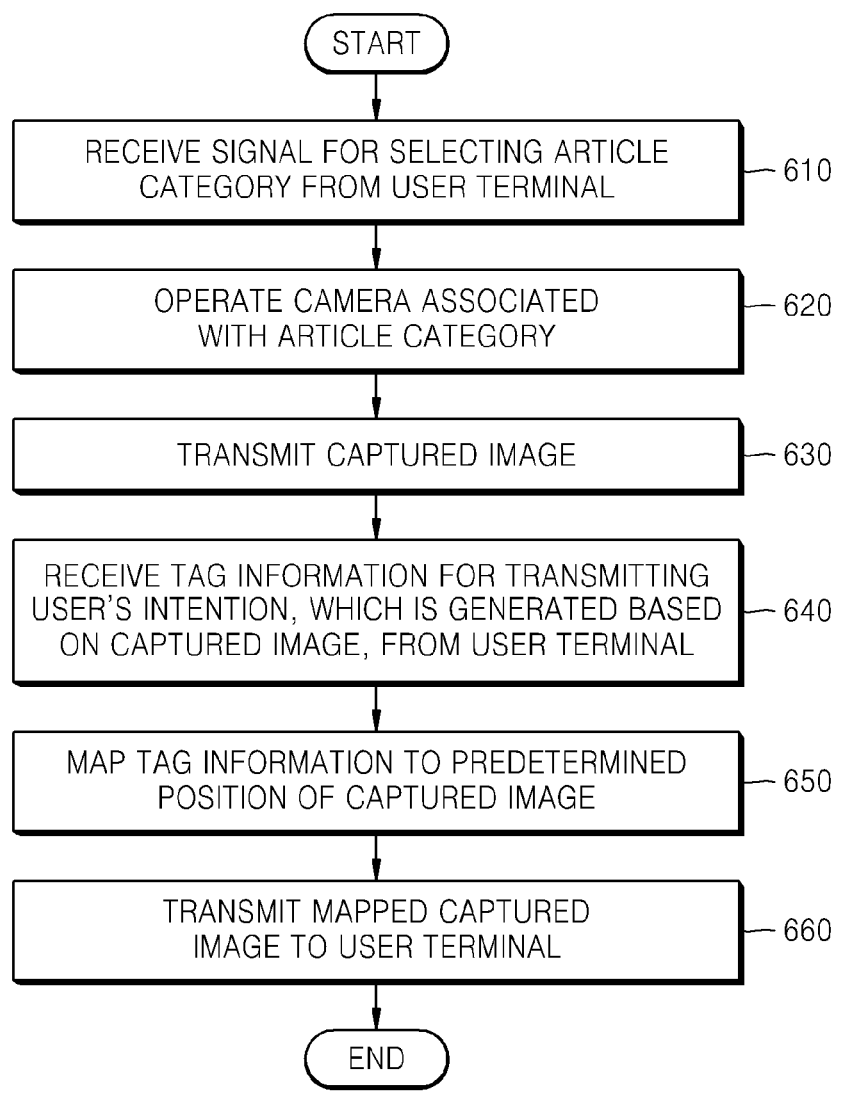

METHOD AND APPARATUS FOR TRANSMITTING USER INTENTION USING CAPTURED IMAGE

CROSS-REFERENCE TO RELATED PATENT APPLICATION

This application claims the benefit of Korean Patent Application No. 10-2011-0050847, filed on May 27, 2011, in the Korean Intellectual Property Office, the disclosure of which is incorporated herein by reference in its entirety.

BACKGROUND

1. Field

A method and apparatus relate to a user's intention transmission system, and more particularly, to a method and apparatus for transmitting user's intention using a captured image.

2. Description of the Related Art

Recently, speed of the data networks in mobile communication terminals have increased as the mobile communication systems further develop. The increase of speed in the data networks including the wireless Internet speeds has caused an increased number of users to use an online shopping service or an online market shopping service via wireless Internet using various devices including the mobile communication terminals.

According to the online shopping service, when a purchaser accesses an online shopping mall via a web browser built into a mobile communication terminal, for example, and selects articles, an online seller transmits article information including a price, a size, and a status of the articles to the mobile communication terminal of the purchaser in a text format.

According to the online market shopping service, when a user terminal accesses an online market shopping mall via a user terminal and logs in, the user terminal is connected to a nearby delivery shop, and the delivery shop delivers articles selected by the user to the user.

However, in the online shopping service or the online market shopping service, it is impossible to check the actual articles in real-time and to represent a user intention.

SUMMARY

One or more aspects provide a method and an apparatus for transmitting a user's intention using a captured image.

According to an aspect of an exemplary embodiment, there is provided a method of transmitting an intention of a user using a captured image, the method including: if a signal for selecting an article category is received from a terminal, capturing articles belonging to the selected article category in the captured image and transmitting the captured image to the terminal; receiving, from the terminal, tag information associated with the intention of the user which is generated based on the captured image; and mapping the received tag information to a predetermined position of the captured image and transmitting the captured image to which the tag information is mapped to the terminal.

The tag information may be text, audio and/or video. The transmitting of the captured image may include, if a selection signal indicating an article category is received from the terminal, capturing corresponding articles with a camera associated with the selected category.

The camera may be a closed circuit television (CCTV).

The camera may be a network camera.

The receiving of the tag information may include identifying tag information of other users by using user identifications (IDs).

The mapping of the received tag information may include identifying the received tag information in a text or audio/video format and mapping the tag information of the identified format to the predetermined position of the captured image.

According to another aspect of an exemplary embodiment, there is provided a method of transmitting an intention of a user using a captured image, the method including: providing a selection of an article category to a server; if the captured image of articles belonging to the article category is received from the server, generating tag information based on the captured image; and transmitting the tag information to the server and receiving the captured image with the tag information being mapped thereto from the server.

The tag information may include a user's article selection and a user comment.

The method may further include, if a tagging operation is completed after receiving from the server the captured image to which the tag information is mapped, transmitting an alarm indicating the tagging operation completion to a shop terminal.

The method may further include, after transmitting the alarm to the shop terminal, moving to an ordering web page and performing an ordering operation.

According to another aspect of an exemplary embodiment, there is provided an apparatus for transmitting an intention of the user, the apparatus including: a capturing unit which generates a captured image by capturing articles; a transmitting unit which transmits the captured image of the articles generated by the capturing unit to a terminal if the terminal selected a corresponding article category, and a tagging processor which maps tag information indicating the intention of the user generated based on the captured image to a predetermined position of the captured image if the tag information is received from the terminal.

According to another aspect of an exemplary embodiment, there is provided an apparatus for transmitting an intention of a user, the apparatus including: a signal processor which controls a transmitting unit to transmit to a server a signal for selecting an article category, and if an image captured by a camera associated with the article category is received from the server, generating tag information based on the captured image, and which control the transmitting unit to transmit the tag information to the server, and which controls a receiving unit to receive the captured image with the tag information mapped thereto; and a display unit which displays the captured image received from the server.

BRIEF DESCRIPTION OF THE DRAWINGS

The above and other aspects will become more apparent by describing in detail exemplary embodiments thereof with reference to the attached drawings in which:

FIG. 5 is a flowchart illustrating the user's intention transmitting method according to an exemplary embodiment; and FIG. 6 is a flowchart illustrating the user's intention transmission tagging method in a tagging server such as the tagging server depicted in FIG. 1, according to an exemplary embodiment.

DETAILED DESCRIPTION

Hereinafter, exemplary embodiments will be described more fully with reference to the accompanying drawings.

Figure 1:
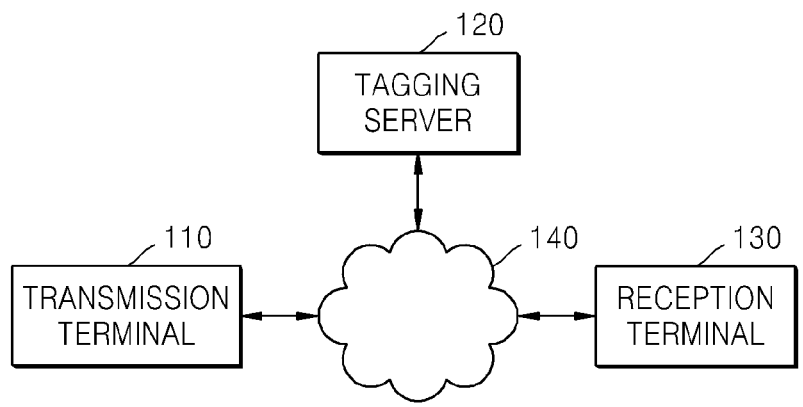
FIG. 1 is a configuration diagram of a user's intention delivery tagging system, according to an exemplary embodiment.

FIG. 1 is a configuration diagram of a user's intention delivery tagging system, according to an exemplary embodiment.

Referring the FIG. 1, the user's intention delivery tagging system includes a transmission terminal 110, a tagging server 120, and a reception terminal 130.

The transmission terminal 110, the tagging server 120, and the reception terminal 130, each transmits and receives tagging information which includes user's intention. This tagging information is transmitted to and from each other via a network 140.

The transmission terminal 110 corresponds to one of various kinds of mobile devices, such as a cell phone or a notepad, or a user terminal, such as a television (TV) or a Personal Computer (PC). These devices are provided by way of an example and not by way of a limitation.

The transmission terminal 110 may perform a tagging operation for transmitting a user's intention to the tagging server 120 on a specific application or web. That is, the transmission terminal 110 transmits a signal for selecting an article category selected by a user to the tagging server 120, and if an image captured by a camera, the image showing an article associated with the selected category is received from the tagging server 120, the transmission terminal 110 generates tag information for transmitting the user's intention based on the captured image and receives a captured image to which the tag information is mapped from the tagging server 120.

If the tagging server 120 receives the signal for selecting an article category from the transmission terminal 110, the tagging server 120 transmits the captured image to the transmission terminal 110, and if the tagging server 120 receives the tag information for transmitting the user's intention based on the captured image from the transmission terminal 110, the tagging server 120 maps the tag information to a user's desired position of the captured image. Here, if the tagging server 120 receives the selection signal indicating the article category from the transmission terminal 110, the tagging server 120 captures corresponding articles by operating the camera associated with the selected category.

The reception terminal 130 displays the captured image to which the tag information for transmitting the user's intention is mapped on a screen or transmits a response of the tag information to the transmission terminal 110 as soon as the reception terminal 130 receives a tagging operation completion alarm from the transmission terminal 110.

Figure 2A:
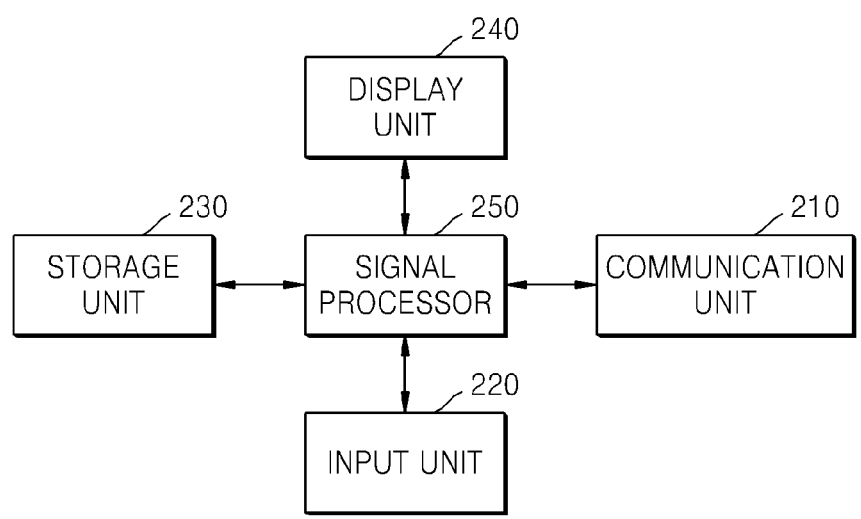
FIG. 2A is a block diagram of a transmission terminal such as the one depicted in FIG. 1 according to an exemplary embodiment.

FIG. 2A is a block diagram of a transmission terminal such as the transmission terminal 110 depicted in FIG. 1.

Referring to FIG. 2A, the transmission terminal 110 includes a communication unit 210, an input unit 220, a storage unit 230, a display unit 240, and a signal processor 250.

The communication unit 210 communicates with the tagging server 120.

The input unit 220 allows the user to input a user operation command associated with tagging processing using a plurality of buttons. For example, the input unit 220 may be buttons, a direction key, or a combination thereof, but is not limited to.

The storage unit 230 stores tagging-related data processed by the signal processor 250 or data required for a control operation of the signal processor 250. The storage unit 230 may be tangible computer readable medium such as a magnetic recording medium, such as a hard disc, or a nonvolatile memory, such as an EEPROM or a flash memory, but is not limited thereto.

The display unit 240 displays a captured image received from the tagging server 120 and an operation command input from the input unit 220.

The signal processor 250 transmits a selection signal indicating an article category selected by the user to the tagging server 120 via the communication unit 210, and if an image captured by a camera associated with the article category is received from the tagging server 120, generates tag information for transmitting the user's intention based on the captured image, transmits the tag information to the tagging server 120 via the communication unit 210, and receives a captured image to which the tag information is mapped from the tagging server 120.

Figure 2B:
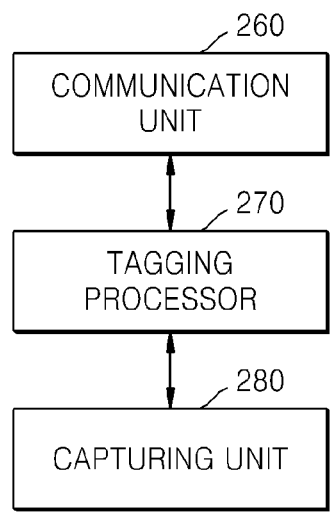
FIG. 2B is a block diagram of a tagging server such as the one depicted in FIG. 1 according to an exemplary embodiment.

FIG. 2B is a block diagram of the tagging server 120 of FIG. 1.

Referring to FIG. 2B, the tagging server 120 includes a communication unit 260, a tagging processor 270, and a capturing unit 280.

The communication unit 260 communicates tagging-related data with the transmission terminal 110 via the network 140 in a wired or wireless way.

The capturing unit 280 generates a captured image by capturing articles of a selected category if the tagging server 120 receives a signal for selecting an article category from the transmission terminal 110. The capturing unit 280 may correspond to a closed circuit television (CCTV) or a network camera for capturing articles in a shop but is not limited thereto.

The tagging processor 270 transmits the captured image captured by the capturing unit 280 to the transmission terminal 110 via the communication unit 260 if the tagging server 120 receives the signal for selecting an article category from the transmission terminal 110, and maps tag information associated with transmission of a user's intention to a predetermined position of the captured image if the tagging server 120 receives the tag information from the transmission terminal 110.

Figure 3:
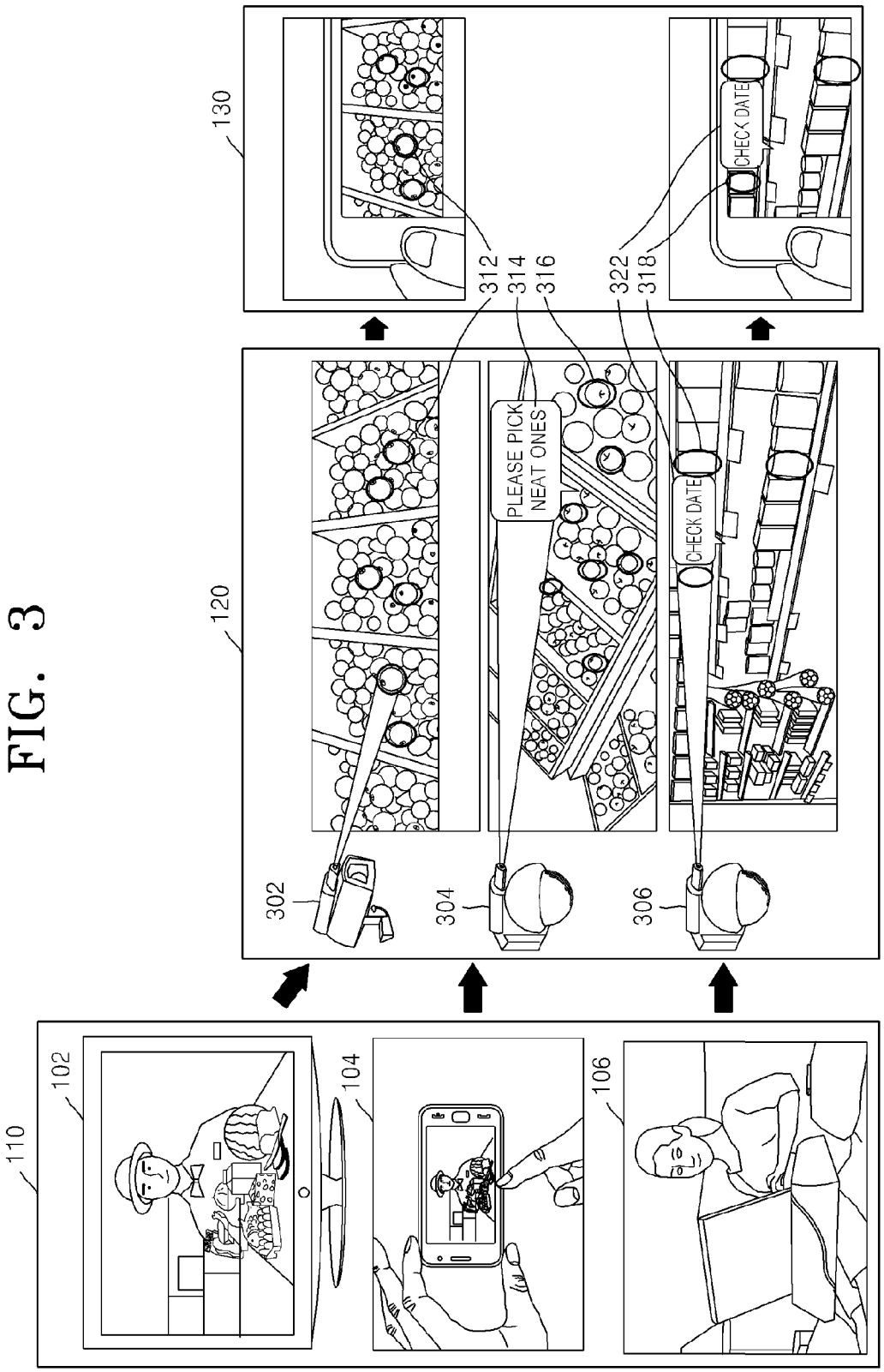
FIG. 3 is a diagram illustrating a market shopping service with a user's intention transmitting method according to an exemplary embodiment.

FIG. 3 is a diagram illustrating a market shopping service with a user's intention transmission tagging method according to an exemplary embodiment.

Referring to FIGS. 1 and 3, the transmission terminal 110 may be a TV 102, a smartphone 104, or a PC 106.

If a user desires to receive the market shopping service, the transmission terminal 110 accesses the tagging server 120 having CCTVs 302, 304, and 306. The user checks advertised articles of an online shop by accessing the online shop. Then, the transmission terminal 110 displays article images of a real shop captured by the CCTVs 302, 304, and 306. For example, the TV 102 displays an article image of the real shop captured by the CCTV 302 on a screen thereof, the smartphone 104 displays an article image of the real shop captured by the CCTV 304 on a screen thereof, and the PC 106 displays an article image of the real shop captured by the CCTV 306 on a screen thereof.

The user selects an article while viewing an article image captured by the CCTVs 302, 304, and 306 via the transmission terminal 110 and edits a comment on the selected article image. The tagging server 120 tags the user's selection and comment information edited using the transmission terminal 110 on the article image. For example, a user of the TV 102 selects a desired article 312 while viewing the CCTV 302, a user of the smartphone 104 selects a desired article 316 and edits a comment 314 while viewing the CCTV 304, and a user of the PC 106 selects a desired article 318 and edits a comment 322 while viewing the CCTV 306. Then the tagging server 120 tags the selection and comment information edited by the users on the captured images (a real view).

A shop worker performs the market shopping service by performing the desired actions on the selected articles as instructed by the comments transmitted from the transmission terminal 110, using the reception terminal 130. For example, the shop worker may pick selected articles 312 as shown in the reception terminal 130. The shop worker may also check date 322 of the article 318.

Figure 4:
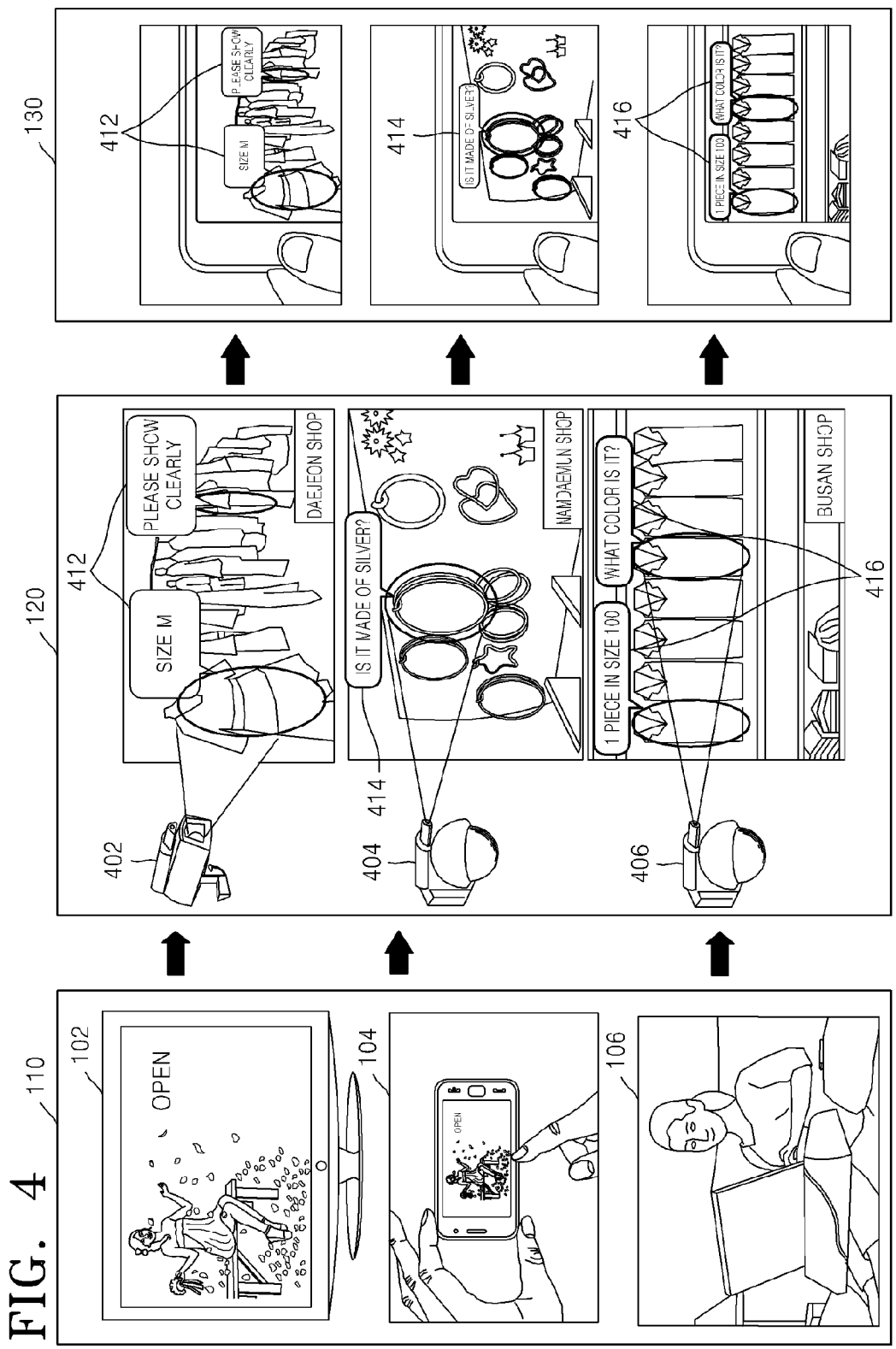
FIG. 4 is a diagram illustrating an article purchase service in an offline shop with a user's intention transmitting method according to an exemplary embodiment.

FIG. 4 is a diagram illustrating an article purchase service in an offline shop with the user's intention transmission tagging method according to an exemplary embodiment.

Referring to FIGS. 1 and 4, the transmission terminal 110 may be the TV 102, the smartphone 104, or the PC 106. The tagging server 120 has CCTVs 402, 404, and 406.

If a user desires to receive the article purchase service, the transmission terminal 110 accesses the tagging server 120 having the CCTVs 402, 404, and 406. Then the user operates the transmission terminal 110 to access the CCTVs 402, 404, and 406 in the offline shop. For example, the TV 102 accesses the CCTV 402 in a Daejeon shop, the smartphone 104 accesses the CCTV 404 in a Namdaemun shop, and the PC 106 accesses the CCTV 406 in a Busan shop.

The transmission terminal 110 displays article images captured by the CCTVs 402, 404, and 406 of the tagging server 120 on a screen thereof. The user selects an article and edits a comment on the selected article image while viewing the article images captured by the CCTVs 402, 404, and 406 via the transmission terminal 110. The tagging server 120 tags the user's selection and input/modified/selected comment information using the transmission terminal 110 on the selected article image. For example, a user of the TV 102 selects desired articles and inputs or selects comments 412 while viewing the CCTV 402. That is, the user may select a size M or request that the article is shown more clearly or from a different angle or view using comments 412. A user of the smartphone 104 selects a desired article and selects or inputs a comment 414 (is it made of silver?) while viewing the CCTV 404, and a user of the PC 106 selects desired articles and selects or inputs a comments 416 (one piece in size 100 and what color is it?) while viewing the CCTV 406. Then the tagging server 120 tags the selection and comment information edited by the users on the captured images (a real view).

Shop workers performs a home-delivery service by performing a requested action on the selected articles based on the comments 412, 414, and 416, respectively, transmitted from the respective transmission terminal 110, using the reception terminal 130.

FIG. 5 is a flowchart illustrating a user's intention transmitting method according to an exemplary embodiment.

Referring to FIGS. 1 and 5, the transmission terminal 110 corresponds to a user terminal, and the reception terminal 130 corresponds to a staff terminal to deliver articles.

If a user desires to receive a market shopping service or a home-delivery service via a specific application or a web page, the transmission terminal 110 requests the tagging server 120 for an access in operation 510.

In operation 512, the tagging server 120 transmits an access response message to the transmission terminal 110.

Upon recognizing the access response message, the transmission terminal 110 checks article categories provided by the tagging server 120 and selects an article category desired by the user, e.g., a fruit shop or a clothes shop, in operation 514.

In operation 516, the transmission terminal 110 transmits the article category information selected by the user to the tagging server 120.

Upon receiving the article category selection signal from the transmission terminal 110, the tagging server 120 operates a camera associated with the article category in operation 518 and generates a captured image of articles corresponding to the article category by capturing the articles using the camera in operation 520. The camera may be a CCTV or a network camera but is not limited thereto.

In operation 522, the tagging server 120 transmits the captured image of the articles captured by the camera to the transmission terminal 110.

In operation 524, the transmission terminal 110 receives the captured image from the tagging server 120 and displays the captured image on a screen thereof.

In operation 526, the user recognizes the articles based on the captured image displayed on the screen via the transmission terminal 110 and in operation 528, the user performs actions on the article such selecting an article or inputting a comment to the article.

In operation 530, the transmission terminal 110 generates tag information for transmitting a user's intention based on the captured image and the input comment.

For example, when the user selects an article or edits a comment on a real view displayed on the transmission terminal 110, the transmission terminal 110 generates tag information corresponding to the article selection or comment. The tag information has a text and/or audio/video format but is not limited thereto.

In operation 532, the transmission terminal 110 transmits the tag information for transmitting the user's intention, which is generated by the user, to the tagging server 120.

In operation 534, the tagging server 120 performs a tagging operation for mapping the tag information received from the transmission terminal 110 to a desired position of the captured image. Here, the tagging server 120 identifies the received tag information in the text or audio/video format and maps the tag information of the text or audio/video format to a position of the captured image (e.g. zoom in on the buttons on the dress). Also, the tagging server 120 may identify tag information of other users or customers using corresponding user or customer IDs.

In operation 536, the tagging server 120 transmits a captured image to which the tag information for transmitting the user's intention is tagged to the transmission terminal 110.

In operation 538, the transmission terminal 110 checks whether the user has completed tagging.

If the tagging has been completed, the transmission terminal 110 transmits a tagging completion alarm to the reception terminal 130 for a shop staff and simultaneously transmits the captured image to which the tag information for transmitting the user's intention is tagged to the reception terminal 130 in operation 540, moves to an ordering web page in operation 542, and performs an order, such as an approval on the order in operation 544. In this case, the reception terminal 130 may identify tag information of different customers based on customer IDs.

As soon as the reception terminal 130 receives the tagging completion alarm from the transmission terminal 110, the reception terminal 130 displays the captured image to which the tag information for transmitting the user's intention is tagged, which is received from the transmission terminal 110, on a screen thereof in operation 548.

In operation 550, the shop staff performs a delivery by confirming the tag information for transmitting the user's intention, which is displayed on the screen of the reception terminal 130. At this time, the shop staff may transmit a response based on the tag information to the transmission terminal 110 via the reception terminal 130.

Finally, the shop staff performs the market shopping service or the delivery service according to the displayed order of the user.

According to an exemplary embodiment, a user may correctly transmit his or her intention to a market shopping service staff or a shop staff by tagging user intention information to desired articles while viewing a monitoring camera. In addition, a market shopping service center or an offline shop may correctly perceive and deliver articles desired by a user by confirming received tag information.

FIG. 6 is a flowchart illustrating a user's intention transmitting method in a tagging server such as the tagging server 120 depicted in FIG. 1, according to an exemplary embodiment.

Referring to FIGS. 1 and 6, in operation 610, the tagging server 120 receives a signal for selecting an article category from a user terminal.

Upon receiving the signal for selecting an article category from the user terminal, the tagging server 120 captures corresponding articles by operating a camera associated with the selected article category in operation 620.

In operation 630, the tagging server 120 transmits an image captured by the camera to the user terminal.

In operation 640, the tagging server 120 receives tag information for transmitting a user's intention based on the captured image from the user terminal.

In operation 650, the tagging server 120 maps the tag information received from the user terminal to a predetermined position of the captured image, which is selected by the user.

In operation 660, the tagging server 120 transmits a captured image to which the tag information is mapped to the user terminal.

Consequently, the user may tag his or her intention information to a desired article while viewing a monitoring camera to correctly transmit the user's intention to a market shopping service staff or a shop staff.

Exemplary embodiments can be written as computer programs and can be implemented in general-use digital computers that execute the programs using a computer-readable recording medium. Examples of the computer-readable recording medium include tangible storage media, such as magnetic storage media (e.g., ROM, floppy disks, hard disks, etc.) and optical recording media (e.g., CD-ROMs, or DVDs).

While exemplary embodiments have been particularly shown and described, it will be understood by those of ordinary skill in the art that various changes in form and details may be made therein without departing from the spirit and scope of the inventive concept as defined by the appended claims. The exemplary embodiments should be considered in a descriptive sense only and not for purposes of limitation. Therefore, the scope of the invention is defined not by the detailed description of exemplary embodiments but by the appended claims, and all differences within the scope will be construed as being included in the present invention.

What is claimed is:

1. A method of transmitting an intention of a user using a captured image, the method comprising:
    if a signal for selecting an article category is received from a first terminal, generating a captured image of articles belonging to the selected article category and transmitting the captured image to the first terminal;
    if the first terminal generates tag information associated with the intention of the user based on the captured image, receiving, from the first terminal, the tag information associated with the intention of the user; and
    mapping the received tag information to a position of an article selected from the articles within the captured image and transmitting the captured image to which the tag information is mapped to a second terminal,
    wherein the mapping the received tag information comprises identifying the tag information and mapping the tag information to a predetermined position of the captured image based on the identified tag information.

2. The method of claim 1, wherein the tag information is at least one of text, audio, and video.

3. The method of claim 1, wherein the transmitting of the captured image comprises, if a selection signal indicating the article category is received from the terminal, capturing corresponding articles by operating a camera associated with the selected category.

4. The method of claim 3, wherein the camera is a closed circuit television (CCTV).

5. The method of claim 3, wherein the camera is a network camera.

6. The method of claim 1, wherein the receiving of the tag information comprises identifying tag information of other users by using user identifications (IDs).

7. A non-transitory computer-readable recording medium storing a computer-readable program for executing the method of claim 1.

8. The method of claim 1, wherein the captures image shows the articles in the selected article category.

9. A method of transmitting an intention of a user using a captured image, the method comprising:
    if a signal for selecting an article category is received from a first terminal, generating a captured image of articles belonging to the selected article category and transmitting the captured image to the first terminal;
    if the first terminal generates tag information associated with the intention of the user based on the captured image, receiving, from the first terminal, the tag information associated with the intention of the user; and
    mapping the received tag information to a position of an article selected from the articles within the captured image and transmitting the captured image to which the tag information is mapped to a second terminal,
    wherein the mapping of the received tag information comprises identifying the received tag information in a text or audio/video format and mapping the tag information of the identified format to a predetermined position of the captured image.

10. A method of transmitting an intention of a user using a captured image, the method comprising:
  providing a selection of an article category to a server;
  if the captured image of articles belonging to the article category is received from the server, generating tag information corresponding to the intention of the user on the captured image of articles; and
  transmitting the tag information to the server and receiving, from the server, the captured image with the tag information being mapped to an article selected from the articles within the captured image,
  wherein the mapping comprises identifying the tag information and mapping the tag information to a predetermined position of the captured image based on the identified tag information.

11. The method of claim 10, wherein the tag information comprises a user selection of an article and a user comment.

12. The method of claim 10, further comprising, if a tagging operation is completed after receiving from the server the captured image to which the tag information is mapped, transmitting an alarm indicating the tagging operation completion to a shop terminal.

13. The method of claim 12, further comprising, after transmitting the alarm to the shop terminal, moving to an ordering web page and performing an ordering operation.

14. A non-transitory computer-readable recording medium storing a computer-readable program for executing the method of claim 10.

15. An apparatus for transmitting an intention of the user, the apparatus comprising:
  a capturing unit which generates a captured image of articles if a signal for selecting an article category is received from a first terminal;
  a transmitting unit which transmits the captured image of the articles generated by the capturing unit to the first terminal if the first terminal selected a corresponding article category, and
  a tagging processor which maps tag information indicating the intention of the user generated based on the captured image to a position of an article selected from the articles within the captured image if the tag information is received from the first terminal when the first terminal generates a tag information corresponding to the intention of the user on the captured image of articles,
  wherein the tagging processor identifies the tag information received from the first terminal and maps the tag information to a predetermined position of the captured image based on the identified tag information.

16. The apparatus of claim 15, wherein the capturing unit is a closed circuit television (CCTV) or a network camera.

17. An apparatus for transmitting an intention of a user, the apparatus comprising:
  a signal processor which controls a transmitting unit to transmit to a server a signal for selecting an article category, and if an image captured by a camera associated with the article category is received from the server, generating tag information corresponding to the intention of the user on the captured image of articles, and which controls the transmitting unit to transmit the tag information to the server, and which controls a receiving unit to receive the captured image with the tag information mapped to an article selected from the articles within the captured image; and
  a display unit which displays the captured image received from the server,
  wherein the received captured image with the mapped tag information comprises the tag information being mapped to a predetermined position in the captured image based on the tag information transmitted to the server.

18. A method of remotely performing an action related to an article, the method comprising:
  selecting by a user at least one remote article from a plurality of articles depicted in an image;
  requesting by the user to perform at least one action with respect to the selected remote article;
  generating a tag information corresponding to the intention of the user on the selected remote article, wherein the intention of the user comprises the at least one user-requested action with respect to the article;
  transmitting the image with the selected remote article and the tag information to a server;
  mapping the transmitted tag information to the image, wherein the mapping comprises identifying the at least one user-requested action with respect to the article and mapping the tag information to a predetermined position within the image based on the identified user-requested action; and
  transmitting the image with the mapped tag information to a second terminal requesting that the at least one user-requested action be performed.

19. The method of claim 8, wherein the tag is a request to perform at least one action on said one mapped article.

20. The method of claim 19, further comprising: transmitting the tag information mapped to the captured image to the first terminal and in response to receiving an indication that tagging by the first terminal is completed, transmitting an alarm to the second terminal together with the captured image and the mapped tagging information.

* * * * *